United States Patent
Kaushikkar et al.

(10) Patent No.: US 10,795,818 B1
(45) Date of Patent: Oct. 6, 2020

(54) METHOD AND APPARATUS FOR ENSURING REAL-TIME SNOOP LATENCY

(71) Applicant: Apple Inc., Cupertino, CA (US)

(72) Inventors: Harshavardhan Kaushikkar, San Jose, CA (US); Per H. Hammarlund, Sunnyvale, CA (US); Brian P. Lilly, Los Gatos, CA (US); Michael Bekerman, Los Gatos, CA (US); James Vash, San Ramon, CA (US); Manu Gulati, Saratoga, CA (US); Benjamin K. Dodge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/418,811

(22) Filed: May 21, 2019

Related U.S. Application Data

(60) Provisional application No. 62/730,311, filed on Sep. 12, 2018.

(51) Int. Cl.
   *G06F 12/08* (2016.01)
   *G06F 12/0815* (2016.01)
   *G06F 12/0817* (2016.01)

(52) U.S. Cl.
   CPC ...... *G06F 12/0815* (2013.01); *G06F 12/0822* (2013.01); *G06F 2212/1024* (2013.01); *G06F 2212/608* (2013.01)

(58) Field of Classification Search
   CPC ............. G06F 12/0815; G06F 12/0822; G06F 2212/1024
   See application file for complete search history.

(56) References Cited

U.S. PATENT DOCUMENTS

| | | | | |
|---|---|---|---|---|
| 5,355,467 A | * | 10/1994 | MacWilliams | G06F 12/0811 711/146 |
| 5,692,152 A | * | 11/1997 | Cohen | G06F 12/0848 711/122 |
| 6,928,517 B1 | * | 8/2005 | Englin | G06F 12/0811 710/40 |
| 7,818,511 B2 | | 10/2010 | Goodman et al. | |
| 7,987,322 B2 | | 7/2011 | Moyer et al. | |
| 8,131,948 B2 | * | 3/2012 | Moyer | G06F 12/0831 711/146 |
| 8,688,919 B1 | * | 4/2014 | O'Bleness | G06F 12/0831 711/146 |
| 9,703,711 B2 | | 7/2017 | Parikh et al. | |

* cited by examiner

*Primary Examiner* — Than Nguyen
(74) *Attorney, Agent, or Firm* — Kowert, Hood, Munyon, Rankin & Goetzel, P.C.; Erik A. Heter

(57) ABSTRACT

Various systems and methods for ensuring real-time snoop latency are disclosed. A system includes a processor and a cache controller. The cache controller receives, via a channel, cache snoop requests from the processor, the snoop requests including latency-sensitive and non-latency sensitive requests. Requests are not prioritized by type within the channel. The cache controller limits a number of non-latency sensitive snoop requests that can be processed ahead of an incoming latency-sensitive snoop requests. Limiting the number of non-latency sensitive snoop requests that can be processed ahead of an incoming latency-sensitive snoop request includes the cache controller determining that the number of received non-latency sensitive snoop requests has reached a predetermined value and responsively prioritizing latency-sensitive requests over non-latency sensitive requests.

20 Claims, 8 Drawing Sheets

METHOD AND APPARATUS FOR ENSURING REAL-TIME SNOOP LATENCY

BACKGROUND

Technical Field

This disclosure relates to cache subsystems in processors, and more particularly, to the handling of certain transactions in a cache subsystem.

Description of the Related Art

Modern processors often implement cache memories in order to obtain faster access to certain data and/or instructions. Accessing data and/or instructions from a cache may result in better performance of the processor, as the information may be obtained significantly faster than it can be from system memory or storage.

Information may be obtained from a cache by a process referred to as a cache snoop, or simply, a snoop. As used herein, a snoop refers to a search for requested information in support of a cache coherence protocol (e.g., in a multi-processor system in which each processor includes a dedicated cache). When a request for data is sent to a number of processors (or processor cores), caches in each may be snooped to determine if they are holding a copy of that data. This may further allow certain actions to be taken to maintain coherency, such as invalidating data stored in one cache when a same copy of the data has been modified in memory and/or another cache.

In some processors, snoops may be divided into different classes based on a desired latency. Bulk snoops may be cache snoops that do not have a specific desired latency, and are conducted when possible. On the other hand, real-time cache snoops are those in which the snoop is to be conducted within a certain specified time and performance.

SUMMARY

Various method and apparatus embodiments for ensuring real-time snoop latency are disclosed. In one embodiment, a system includes a processor and a cache controller. The cache controller receives, via a channel, cache snoop requests from the processor, the snoop requests including latency-sensitive and non-latency sensitive requests. Requests are not prioritized by type within the channel. The cache controller limits a number of non-latency sensitive snoop requests that can be processed ahead of an incoming latency-sensitive snoop request. Limiting the number of non-latency sensitive snoop requests that can be processed ahead of an incoming latency-sensitive snoop request includes the cache controller determining that the number of received non-latency sensitive snoop requests has reached a predetermined value and responsively prioritizing latency-sensitive requests over non-latency sensitive requests.

In one embodiment, the number of non-latency sensitive requests that may be pending at any given time may be held to no more than a certain number. In this embodiment, an incoming latency-sensitive request is prioritized over an incoming non-latency sensitive request, as well as any others pending in excess of the predetermined value. In another embodiment, the number of non-latency sensitive requests is not limited (other than by physical limitations, e.g., storage space) when no latency-sensitive requests have been received or are pending. When a latency-sensitive request arrives, the number of the pending non-latency sensitive requests that may be processed ahead of it are limited to no more than the predetermined value. In both of these embodiments, re-ordering of cache snoop requests may be performed to ensure that no latency-sensitive requests is preceded in a processing order by a number of non-latency sensitive requests in excess of the predetermined value.

BRIEF DESCRIPTION OF THE DRAWINGS

The following detailed description makes reference to the accompanying drawings, which are now briefly described.

Figure 1:
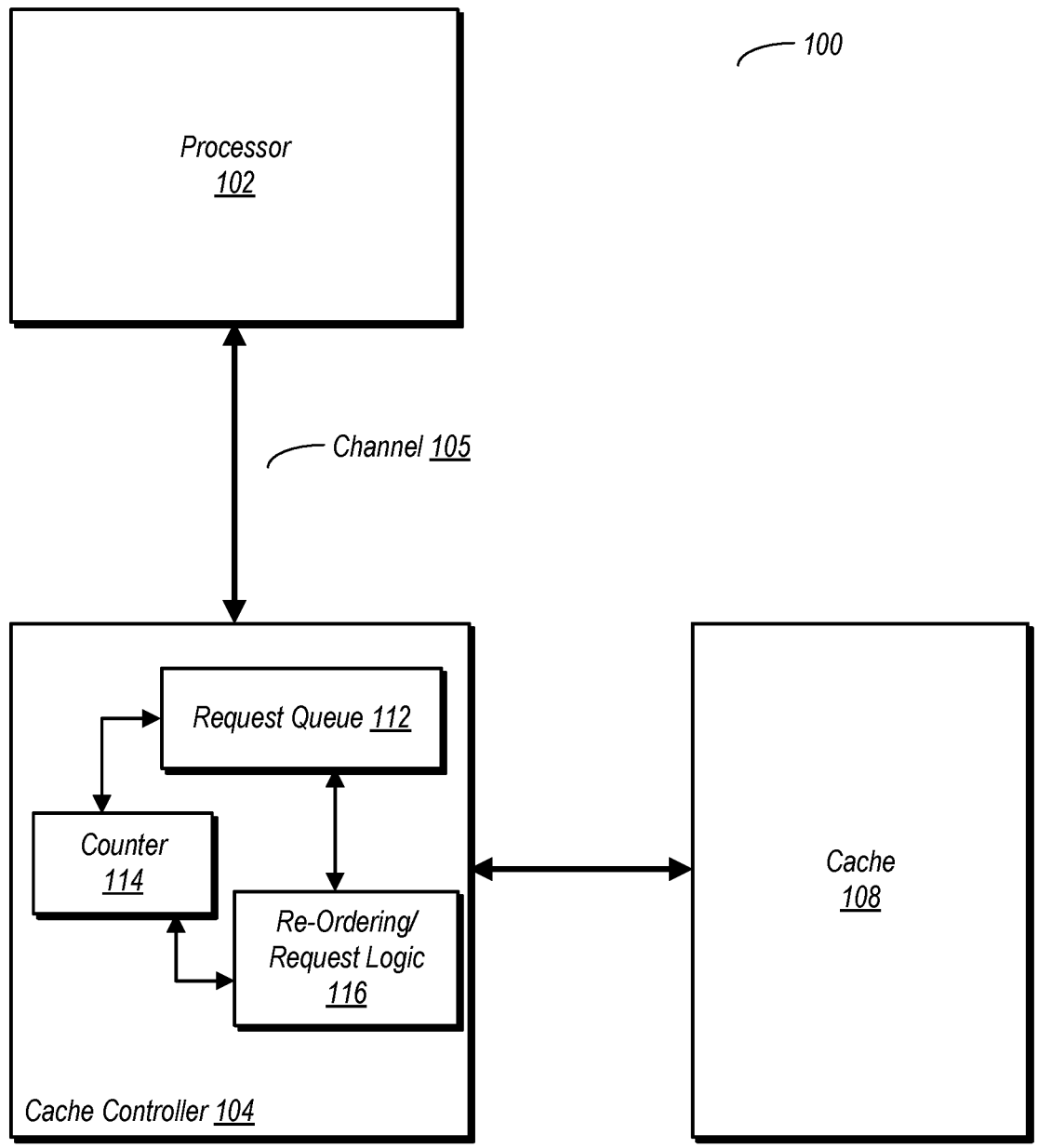
FIG. 1 is a block diagram of one embodiment of a system having a processor and a cache subsystem.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry, that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to various method and apparatus embodiments for ensuring the latency and performance of latency-sensitive cache snoop requests. Successful handling of latency sensitive snoops means achieving a certain bandwidth and that all individual requests achieve a certain maximum latency. In the following we refer to meeting the "latency requirement" of snoops as including also meeting the latency and performance requirement. In a system in which cache snoop requests can be latency-sensitive (e.g., real time snoops) or non-latency sensitive (e.g., bulk snoops), the various method and apparatus embodiments disclosed herein prioritize latency-sensitive requests over at least some non-latency sensitive snoops. A snoop may be latency-sensitive in various cases. For example, latency-sensitive snoops may be those arising from the servicing of real-time tasks where latency is critical, such as those dealing with voice/video data transmission, tasks related to user interface events, and so on. In such tasks, failure to timely process an event could result in corruption, malfunction, or other undesired behavior. Accordingly, latency-sensitive snoops may be those that deal with those tasks whose proper functioning relies on timely processing of events.

The various method and apparatus embodiments discussed herein may be implemented in various types of computer systems. Such systems may include those having multiple processors with multiple cache subsystems and corresponding hierarchies of cache memory.

In a channel coupled between, e.g., an execution unit and a cache controller, snoop requests are not prioritized relative to whether or not they are latency sensitive (e.g., the channel may not support quality-of-service or other techniques for prioritizing snoop traffic). If allowed to be processed in order as received from the channel, without accounting for latency sensitivity of snoop requests, this could result in some latency-sensitive requests not being processed within the desired timeframe. In the present disclosure, a limit is set on the number of non-latency sensitive requests that can be processed ahead of an incoming latency-sensitive request. It is noted nonetheless, that various embodiments of the method and apparatus disclosed herein may be utilized in systems in which a channel used to convey snoop requests does include quality-of-service or other techniques for prioritizing traffic in the channel.

In one embodiment, the number of non-latency sensitive requests that may be pending at any given time may be limited to a predetermined value. In this embodiment, an incoming latency-sensitive request is prioritized over non-latency sensitive requests so that a number of non-latency sensitive requests is no more than the predetermined value. In another embodiment, the number of non-latency sensitive requests pending at a given time is not limited when no latency-sensitive requests are pending. Responsive to the arrival of a latency-sensitive request, the latency-sensitive request is prioritized over non-latency sensitive requests such that the number of the latter pending ahead of the former is no more than the predetermined value. In some embodiments, the cache controller is configured to discard incoming non-latency sensitive snoop requests based on determining that a number of pending non-latency snoop requests has satisfied the predetermined value. In other embodiments, as discussed below, a retry buffer may store at least some non-latency sensitive requests received in excess of the predetermined values.

FIG. 1 is a block diagram of one embodiment of a system having a processor and a cache subsystem. In the embodiment shown, FIG. 1 includes a processor 102 and a cache controller 104 coupled to receive cache snoop requests from the processor via a channel 105. The snoop requests include latency-sensitive snoop requests and non-latency sensitive snoop requests, wherein latency-sensitive snoop requests are not prioritized over non-latency sensitive snoop requests in the channel 105. The cache controller 104 is configured to limit, to a predetermined value, a number of received non-latency sensitive snoop requests that can be processed ahead of an incoming latency-sensitive snoop request. To limit the number of received non-latency sensitive snoop requests that can be processed ahead of the incoming latency-sensitive snoop request the cache controller is further configured to determine that the number of received non-latency sensitive requests has reached the predetermined value and responsively prioritize latency-sensitive snoop requests over non-latency sensitive snoop requests.

Processor 102 in the embodiment shown may be any type of processor that utilizes a cache memory, or a portion thereof, such as an execution circuit. Cache 108 in the embodiment shown may be a cache of any level (e.g., L1, L2, etc.), and may store instructions and/or data. Furthermore, the organization of cache 108 may conform to various types of cache memories, such as a set-associative or fully associative cache.

Cache controller 104 controls access to cache 108, including writing information thereto, searching (snooping) for information stored therein, reading information therefrom, and so on. Further included in cache controller 104 is a re-ordering circuit configured to place, in the processing order, an incoming latency-sensitive snoop request ahead of one or more non-latency sensitive snoop requests when the predetermined value has been reached. In the embodiment shown, this re-ordering circuit is implemented as re-ordering/request (ROR) logic 116. ROR logic 116 in the embodiment shown causes snoops of cache 108 to be conducted responsive to received requests, and causes information to be read when the information is found. In unsuccessful snoops (information not found in the cache), ROR logic 116 may return an indication of the same to processor 102. Generally speaking, ROR logic 116 determines an order in which snoop requests are processed. In one embodiment, cache controller 104, through ROR logic 116, is configured to process non-latency sensitive snoop requests in an order in which they are received in an absence of any received latency sensitive snoop request. When latency-sensitive requests are received, ROR logic 116 may perform re-ordering such that no more than the predetermined number of non-latency sensitive requests are processed ahead of it, as well as ensuring that the time taken to perform the request does not exceed the desired latency.

Cache controller 104 includes a request buffer configured to store pending cache snoop requests. In one embodiment, the cache controller 104 is configured to process cache snoop requests in an order in which they were written into the request buffer. In other embodiments, requests may be processed in a different order in which they were written into the request buffer. As shown in FIG. 1, the request buffer is implemented here are request queue 112. When a request is to be processed, it is accessed from request queue 112 by ROR logic 116.

The size of request queue 112 may vary from one embodiment to the next. In one embodiment, the size of the request queue 112 is based on the predetermined value to which the number of non-latency sensitive requests is limited. For example, the request queue 112 may include a number of entries equal to the predetermined value plus one or more additional entries reserved exclusively for incoming latency sensitive requests. In such an embodiment, non-latency sensitive requests in excess of the limit may be discarded, while those that are placed into request queue 112 are processed in the order received. Incoming latency-sensitive requests may cause some non-latency sensitive requests to be evicted to make storage space available.

In another embodiment, the number of entries in request queue 112 may be equal to the limit with no additional entries, with non-latency sensitive requests being evicted therefrom responsive to the arrival of a latency sensitive request (thus effectively re-ordering at least some requests).

In still another embodiment, request queue 112 may have a number of entries that exceed the predetermined value, and can be used for either latency-sensitive or non-latency sensitive requests. Incoming latency-sensitive requests may be written into this embodiment of request queue 112 and processed in an order that meets the desired latency. In the case where there is insufficient space to receive an incoming latency-sensitive request, a non-latency sensitive request (e.g., the oldest one) may be evicted from the queue.

Cache controller 104 in the embodiment of FIG. 1 includes a counter 114 configured to track a number of pending non-latency sensitive snoop requests. When a new non-latency sensitive request is received, counter 114 may be incremented. When a non-latency sensitive request is carried about by cache controller 104, counter 114 may be decremented. The current count value in this embodiment is conveyed to ROR logic 116 such that it may determine whether the number of non-latency sensitive requests has satisfied the limit that may be pending ahead of a latency-sensitive request.

It is noted that some embodiments may be implemented without a counter 114. For example, embodiments are possible and contemplated in which ROR logic 116, by tracking which entries are occupied in request queue 112, can determine whether the limit has been satisfied, effectively incorporating the function of counter 114 therein.

Figure 2:
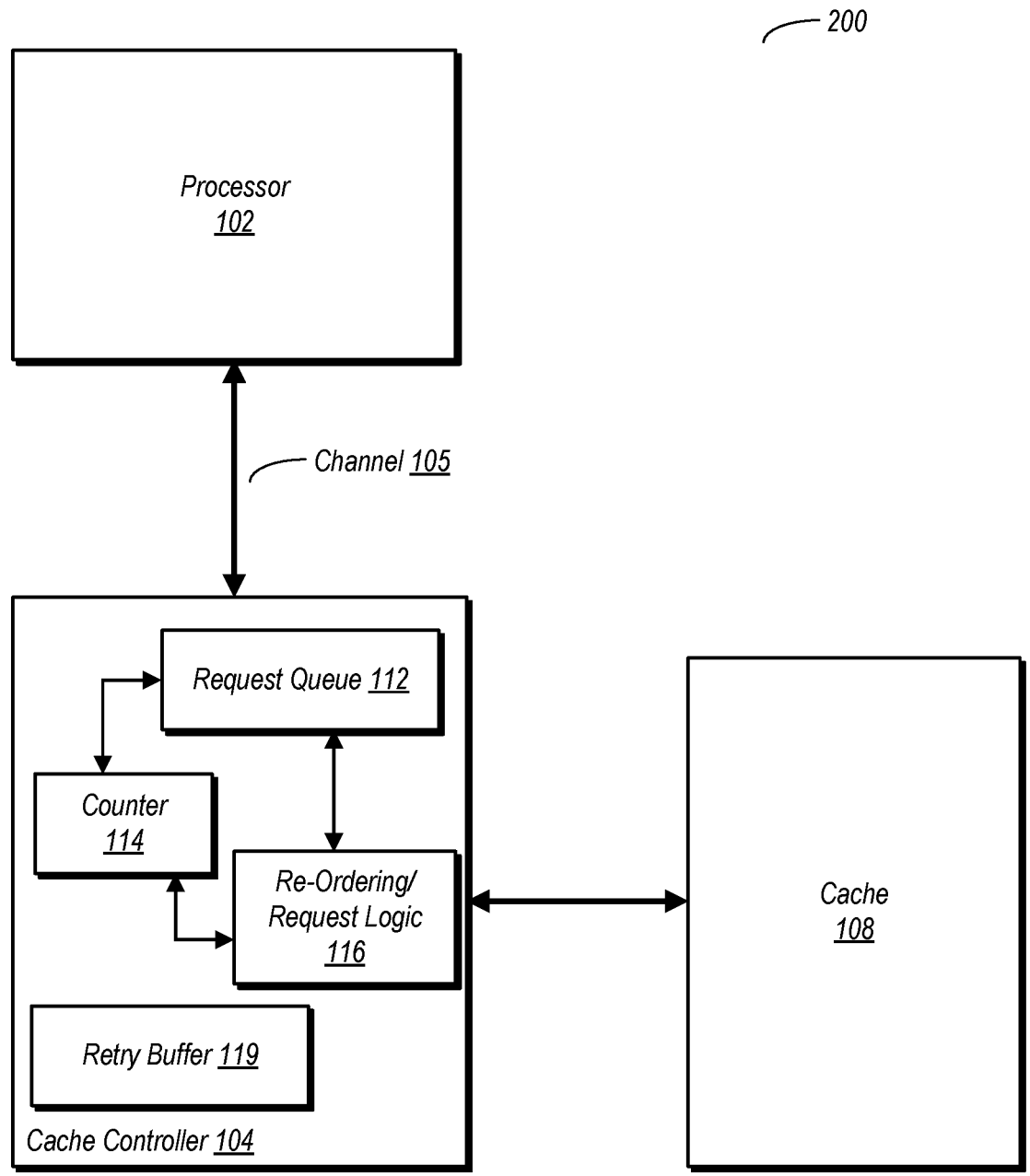
FIG. 2 is a block diagram of another embodiment of a system having a processor and a cache subsystem.

While some embodiments of apparatus 100 may discard non-latency sensitive requests in excess of the predetermined number to which they are limited, other embodiments may store such requests, such as that shown in FIG. 2. Apparatus 200 of FIG. 2 includes elements that are the same or similar to those shown in FIG. 1. However, this embodiment further includes a retry buffer 119, wherein cache controller 104 is configured to store incoming non-latency sensitive snoop requests in the retry buffer when a number of non-latency sensitive snoop requests has satisfied the predetermined value. Requests stored into the retry buffer may be written into the request queue 112 under various conditions, depending on the embodiment. In one embodiment, if no further latency-sensitive requests are pending, non-latency sensitive snoop requests may written into the request queue as space permits. In another embodiment, if request queue 112 has sufficient space, non-latency sensitive requests may be transferred from retry buffer 119 even when latency-sensitive requests are also pending, providing that the number of non-latency sensitive requests in the processing order is no greater than the predetermined value. Furthermore, it is possible in some embodiments that non-latency sensitive requests are transferred from request queue 112 to retry buffer 119 responsive to one or more incoming latency sensitive requests. It is possible in some embodiments that include a retry buffer that non-latency sensitive requests can still be discarded, e.g., when there is insufficient storage space in retry buffer 119 to handle the overflow.

Figure 3:
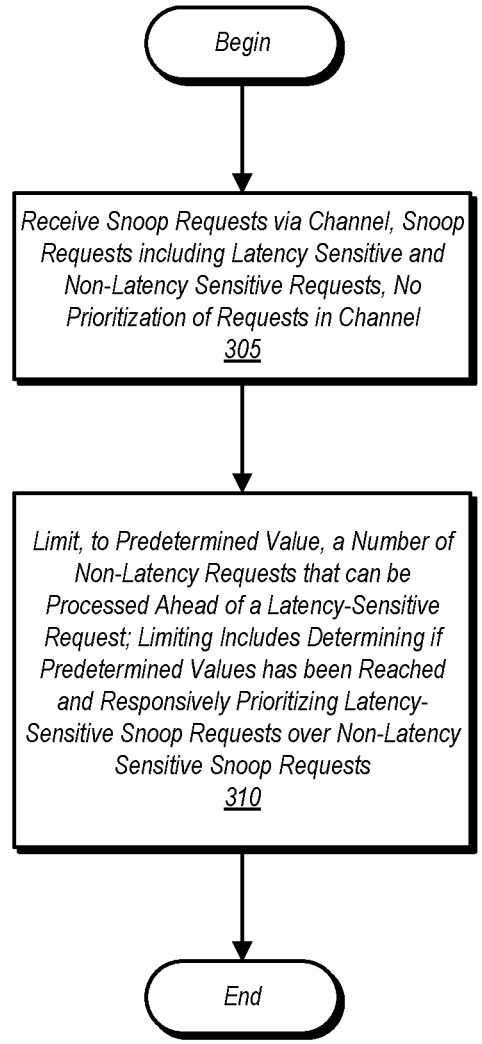
FIG. 3 is a flow diagram of one embodiment of a method for handling cache snoop requests of different latency sensitivities.

FIG. 3 is a flow diagram of one embodiment of a method for handling cache snoop requests of different latency sensitivities. Method 300 may be carried out by various hardware embodiments that fall within the scope of FIGS. 1 and 2 and their corresponding descriptions above. It is further contemplated that hardware embodiments not explicitly discussed herein may be configured to perform method 300, and may thus fall within the scope of this disclosure.

Method 300 contemplates an apparatus having a processor and a cache controller, wherein the cache controller is coupled to receive cache snoop requests from the processor via a channel, the snoop requests including latency-sensitive snoop requests and non-latency sensitive snoop requests, wherein latency-sensitive snoop requests are not prioritized over non-latency sensitive snoop requests in the channel (block 305). The method also contemplates the cache controller limiting, to a predetermined value, a number of received non-latency sensitive snoop requests that can be processed ahead of an incoming latency-sensitive snoop request, wherein to limit the number of received non-latency sensitive snoop requests that can be processed ahead of the incoming latency-sensitive snoop request the cache controller is further configured to determine that the number of received non-latency sensitive requests has reached the predetermined value and responsively prioritize latency-sensitive snoop requests over non-latency sensitive snoop requests (block 310).

Figure 4:
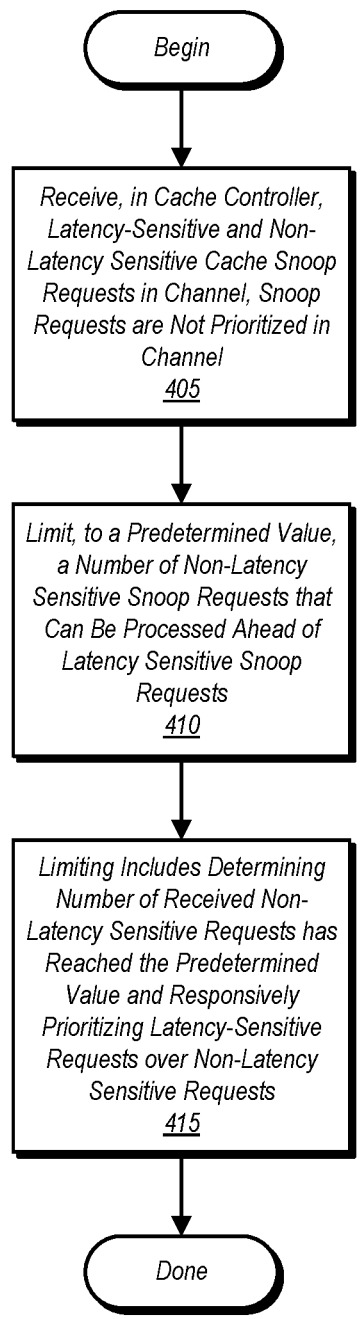
FIG. 4 is a flow diagram of another embodiment of a method for handling cache snoop requests of different latency sensitivities.

FIG. 4 is a flow diagram of another embodiment of a method for handling cache snoop requests of different latency sensitivities. Similar to the method of FIG. 3 discussed above, method 400 of FIG. 4 may be performed by various hardware embodiments discussed above, as well as embodiments not explicitly discussed herein.

Method 400 includes receiving, in a cache controller via a channel, cache snoop requests including latency-sensitive snoop requests non-latency sensitive snoop requests, wherein latency-sensitive snoop requests are not prioritized over non-latency sensitive snoop requests in the channel (block 405). The method further includes limiting, to a predetermined value, a number of received non-latency snoop requests that can processed by the cache controller ahead of an incoming latency-sensitive snoop request (block 410). Limiting the number of received non-latency sensitive snoop requests that can processed by the cache controller ahead of an incoming latency-sensitive snoop request comprises the cache controller determining that the number of received non-latency sensitive requests has reached the predetermined value and responsively prioritizing latency-sensitive snoop requests over non-latency sensitive snoop requests.

In one embodiment, the method includes re-ordering pending cache snoop request to place an incoming latency-sensitive snoop request ahead of one or more non-latency snoop requests when the predetermined value has been reached. Depending on the configuration of the hardware performing method 400, the method may include discarding incoming non-latency sensitive snoop requests when a number of pending non-latency snoop requests is equal to the predetermined value, or alternatively, may include storing incoming non-latency sensitive snoop requests in a retry buffer responsive to the number of received non-latency sensitive requests having reached the predetermined value.

In various embodiments, method 400 may include storing pending cache snoop requests in a buffer and processing a pending cache snoop request, wherein processing the pending cache snoop request comprises accessing the pending cache snoop request from the buffer. Depending on the configuration of the hardware the carries out method 400, the method may include the cache controller processing pending snoop requests in an order in which they were stored into the buffer. The method may further include the cache controller processing non-latency sensitive snoop requests in an order in which they are received when no latency-sensitive snoop requests are pending.

Figure 5:
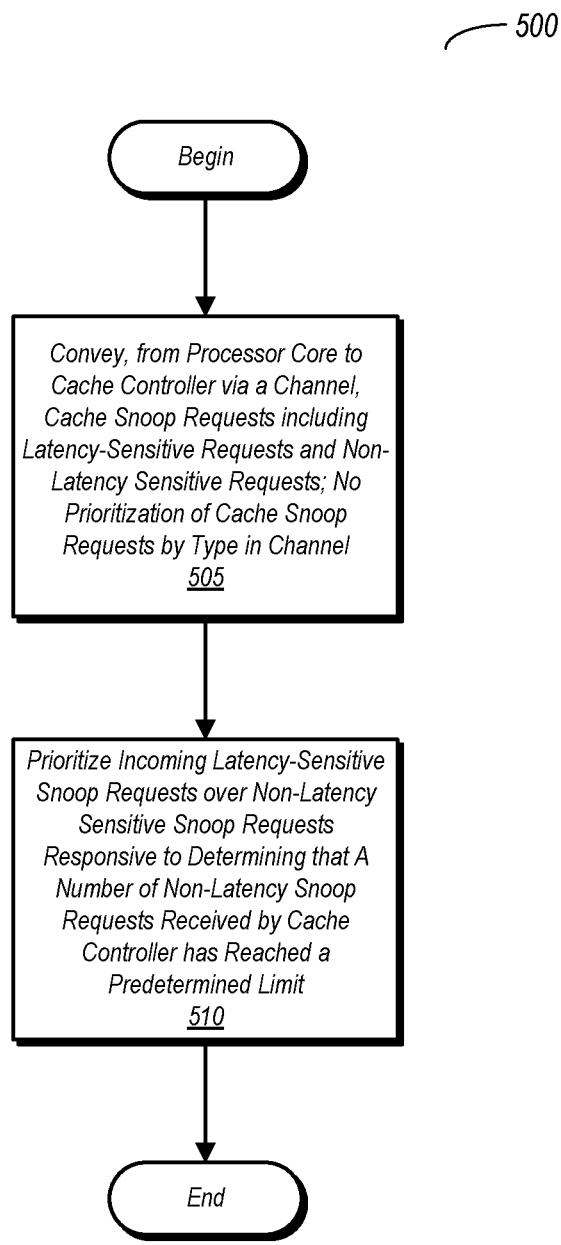
FIG. 5 is a flow diagram of another embodiment of a method for handling cache snoop requests of different latency sensitivities.

FIG. 5 is a flow diagram of another embodiment of a method for handling cache snoop requests of different latency sensitivities. Method 500 as disclosed herein may be carried out by various hardware embodiments, such as those discussed above and any that are similarly configured and thus fall within the scope of this disclosure.

Method 500 includes a processor core conveying cache snoop requests to a cache controller via a communications channel, the cache snoop requests including latency-sensitive snoop requests and non-latency sensitive snoop requests, wherein cache snoop requests are not prioritized by type over one another in the communications channel (block 505). The method further includes prioritizing processing of latency-sensitive snoop requests over non-latency sensitive snoop requests responsive to determining that a number of non-latency snoop requests received thereby has reached a predetermined value (block 510).

In one embodiment of an apparatus arranged to carry out method 500, the cache controller is configured to store incoming non-latency sensitive snoop requests in a retry buffer responsive to the predetermined value having been reached. In another embodiment of an apparatus configured to carry out method 500, the cache controller is configured to discard incoming non-latency sensitive snoop requests when the predetermined value has been reached.

In various embodiments capable of performing method 500, the cache controller is configured to, responsive to determining that the predetermined value has been reached, re-order cache snoop requests such that an incoming latency-sensitive request is processed ahead of one or more received non-latency snoop requests. The cache controller in such embodiments is also configured to process non-latency sensitive snoop requests in an order in which they are received when no latency-sensitive snoop requests are pending. Furthermore, the cache controller in various embodiments includes a buffer configured to store pending cache snoop requests.

Figure 6:
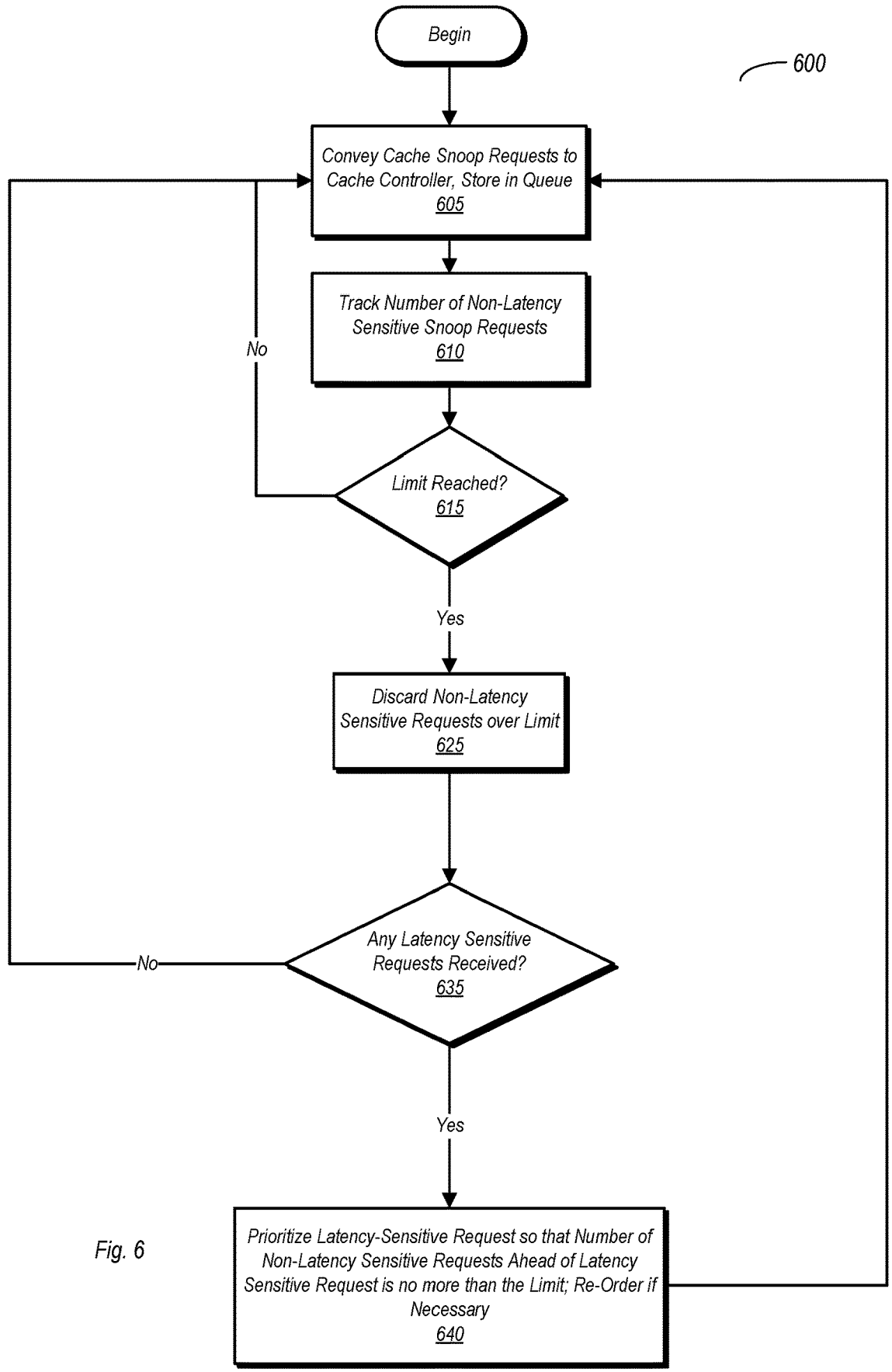
FIG. 6 is a flow diagram of a method embodiment for handling cache snoop requests in which a number of pending non-latency sensitive requests is limited irrespective of any pending latency-sensitive requests.

FIG. 6 is a flow diagram of a method embodiment for handling cache snoop requests in which a number of pending non-latency sensitive requests is limited irrespective of any pending latency-sensitive requests. Method 600 may be performed by hardware embodiments such as that of FIG. 1 and others in which a limit to the number of pending non-latency snoop requests is limited irrespective of whether any latency-sensitive snoop requests are pending.

Method 600 includes conveying cache snoop requests to a cache controller (e.g., from a processor or execution circuit thereof) and storing them in a queue within the cache controller (block 605). The method further includes tracking the number of non-latency sensitive snoop requests that are currently pending (block 610). If the predetermined limit to the number of pending non-latency sensitive snoop requests has not been reached (block 615, no), the method may return to block 605, as more non-latency sensitive snoop requests may be received and stored in the queue.

If the limit to the number of pending non-latency sensitive requests has been reached (block 615, yes), then subsequently received non-latency requests are discarded (block 625). In some embodiments, a processor core/execution circuit may re-submit discarded requests. Furthermore, when discarding a request, the cache controller may provide an indication of the same to the processor core/execution circuit from where it was submitted.

If no latency-sensitive requests are received (block 635, no), the method returns to block 605. Upon receipt of a latency-sensitive request when limit has been reached (block 635), the latency sensitive requests are prioritized so that the number of non-latency sensitive requests ahead of the latency-sensitive request in the processing order is no more than the limit, which may include re-ordering requests (block 640). In re-ordering requests, a latency-sensitive request may be moved up in the processing order to any position such that the maximum number of non-latency sensitive requests ahead of it is no more than the predetermined limit.

Figure 7:
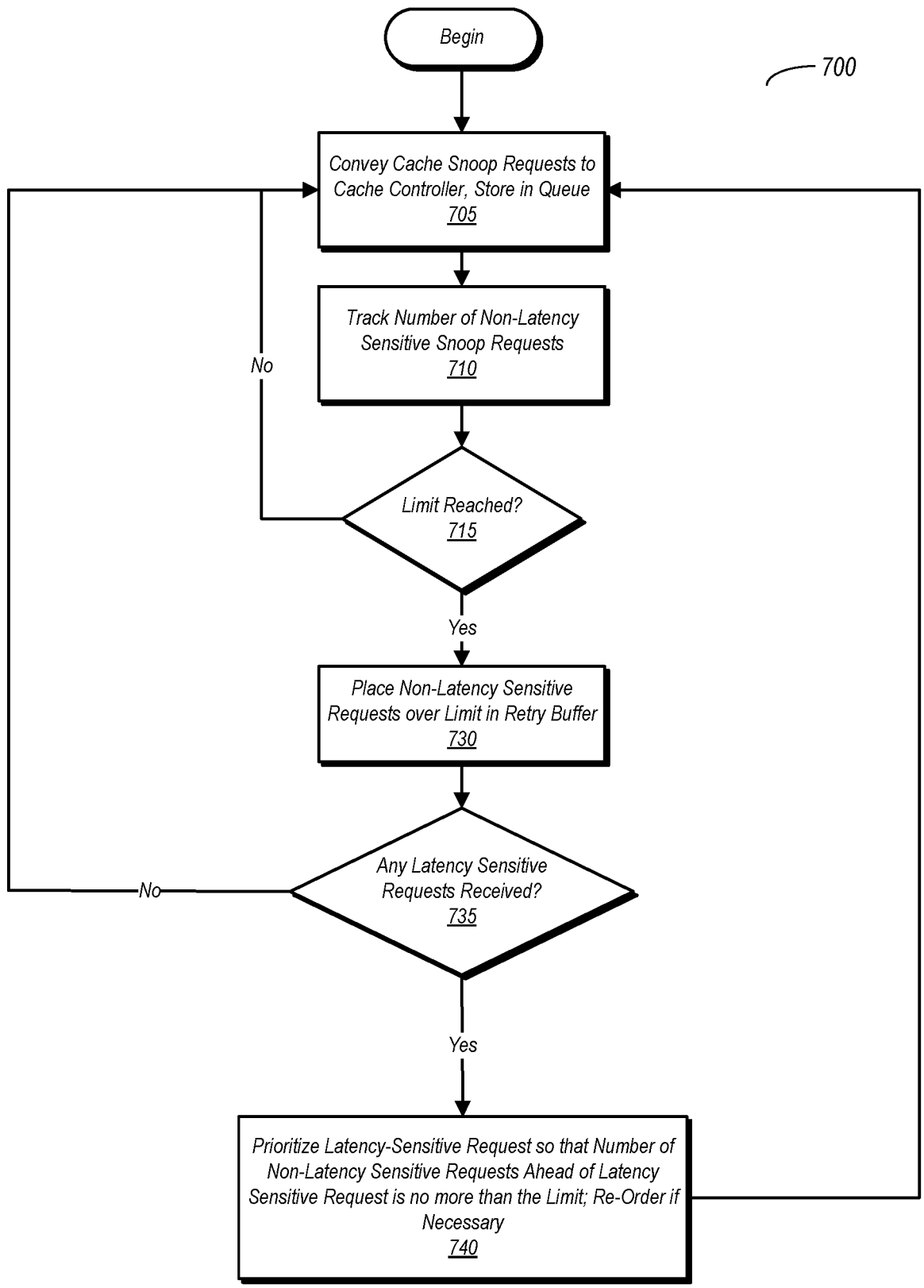
FIG. 7 is a flow diagram of a method embodiment for handling cache snoop requests in a hardware embodiment having a retry buffer.

FIG. 7 is a flow diagram of a method embodiment for handling cache snoop requests in a hardware embodiment having a retry buffer. This may allow the number of non-latency sensitive requests to be effectively unbounded in the absence of any pending latency-sensitive requests. Method 700 may be performed by various hardware embodiments such as that shown above in FIG. 2, and may be performed by others as well in which a retry buffer or other storage space is provided for non-latency sensitive requests received in excess of the limit.

Method 700 includes conveying cache snoop requests to a cache controller (e.g., from a processor or execution circuit thereof) and storing them in a queue within the cache controller (block 705). The method further includes tracking the number of non-latency sensitive snoop requests that are currently pending (block 710). If the predetermined limit to the number of pending non-latency sensitive snoop requests has not been reached (block 715, no), the method may return to block 605, as more non-latency sensitive snoop requests may be received and stored in the queue.

If the limit has been reached (block 715, yes), any subsequently received non-latency sensitive requests in excess of the limit may be placed in a retry buffer (block 735). In some embodiments, the retry buffer may be an entity that is entirely separate from the request buffer from which requests are drawn to be processed. In other embodiments, the retry buffer may be in the same storage entity, but in space that is reserved exclusively for non-latency sensitive requests over the limit.

If no latency sensitive requests have been received (block 735, no), the method continues through block 705, receiving and storing non-latency sensitive requests, with the location of their storage depending on the number of received non-latency sensitive requests relative to the limit. If a latency sensitive request is received (block 735, yes), it is prioritized over received non-latency sensitive requests such that the number of the latter preceding it in the processing order is no more than the predetermined limit (block 740). When a latency-sensitive request is pending and the number of non-latency sensitive requests preceding it in the processing order is at the limit, subsequently received non-latency sensitive requests may be automatically placed in the retry buffer, space permitting. As requests are processed and the latency-sensitive request moves up in the processing order, other requests may be placed behind it. Non-latency sensitive requests placed behind a latency-sensitive request that is progressing through the processing order may be drawn from the retry buffer.

Figure 8:
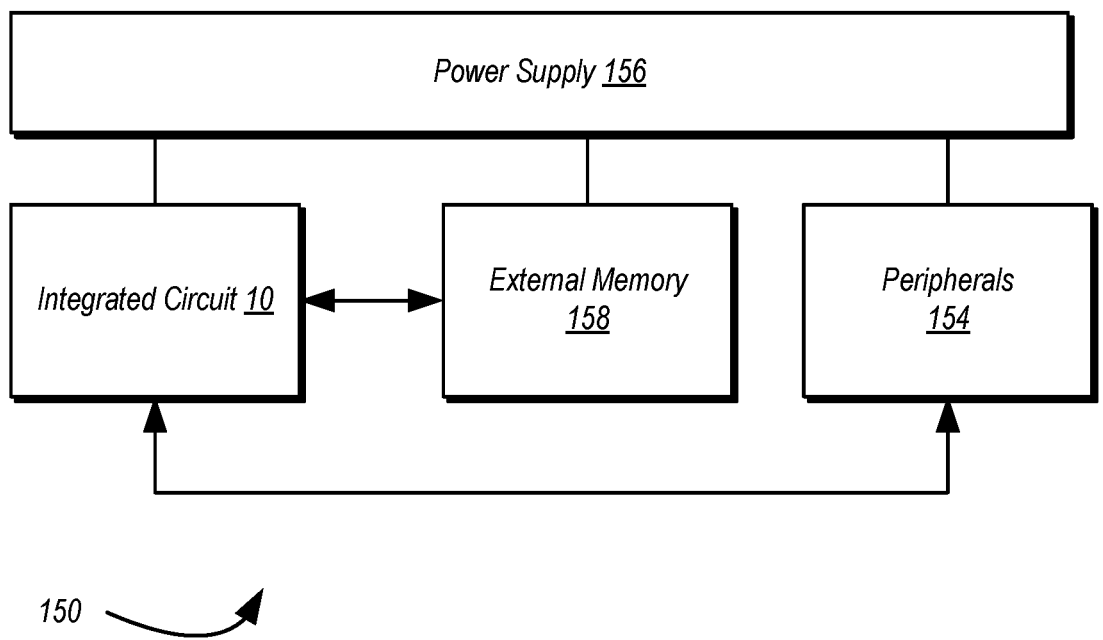
FIG. 8 is a block diagram of one embodiment of an example system.

Turning next to FIG. 8, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.). In some embodiments, integrated circuit 10 may include various functional circuit blocks such as those discussed above in reference to FIGS. 1 and 2, and may thus carry out various embodiments of the methods discussed with reference to FIGS. 3-7.

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a processor; and
a cache controller coupled to receive cache snoop requests from the processor via a channel, the snoop requests including latency-sensitive snoop requests and non-latency sensitive snoop requests, wherein latency-sensitive snoop requests are not prioritized over non-latency sensitive snoop requests in the channel;
wherein the cache controller is configured to limit, to a predetermined value, a number of received non-latency sensitive snoop requests that can be processed ahead of an incoming latency-sensitive snoop request;
wherein to limit the number of received non-latency sensitive snoop requests that can be processed ahead of the incoming latency-sensitive snoop request the cache controller is further configured to determine that the number of received non-latency sensitive requests has reached the predetermined value and responsively prioritize latency-sensitive snoop requests over non-latency sensitive snoop requests.

2. The apparatus as recited in claim 1, wherein the cache controller is configured to process non-latency sensitive snoop requests in an order in which they are received in an absence of any received latency sensitive snoop requests.

3. The apparatus as recited in claim 1, wherein the cache controller is configured to discard incoming non-latency sensitive snoop requests based on determining that a number of pending non-latency snoop requests has satisfied the predetermined value.

4. The apparatus as recited in claim 1, wherein the cache controller includes a request buffer configured to store pending cache snoop requests, wherein the cache controller is configured to process cache snoop requests in an order in which they were written into the request buffer.

5. The apparatus as recited in claim 4, further comprising a retry buffer, wherein the cache controller is configured to store incoming non-latency sensitive snoop requests in the retry buffer when a number of non-latency sensitive snoop requests has reached the predetermined value.

6. The apparatus as recited in claim 1, further comprising a counter configured to track a number of pending non-latency sensitive snoop requests.

7. The apparatus as recited in claim 1, further comprising a re-ordering circuit configured to place an incoming latency-sensitive snoop request ahead of one or more non-latency sensitive snoop requests when the predetermined value has been reached.

8. A method comprising:
receiving, in a cache controller via a channel, cache snoop requests including latency-sensitive snoop requests non-latency sensitive snoop requests, wherein latency-sensitive snoop requests are not prioritized over non-latency sensitive snoop requests in the channel; and
limiting, to a predetermined value, a number of received non-latency snoop requests that can processed by the cache controller ahead of an incoming latency-sensitive snoop request;
wherein limiting the number of received non-latency sensitive snoop requests that can processed by the cache controller ahead of an incoming latency-sensitive snoop request comprises the cache controller determining that the number of received non-latency sensitive requests has reached the predetermined value and responsively prioritizing latency-sensitive snoop requests over non-latency sensitive snoop requests.

9. The method as recited in claim 8, further comprising re-ordering pending cache snoop request to place an incoming latency-sensitive snoop request ahead of one or more non-latency snoop requests when the predetermined value has been reached.

10. The method as recited in claim 8, further comprising discarding incoming non-latency sensitive snoop requests when a number of pending non-latency snoop requests is equal to the predetermined value.

11. The method as recited in claim 8, further comprising storing incoming non-latency sensitive snoop requests in a retry buffer responsive to the number of received non-latency sensitive requests having reached the predetermined value.

12. The method as recited in claim 8, further comprising:
storing pending cache snoop requests in a buffer; and
processing a pending cache snoop request, wherein processing the pending cache snoop request comprises accessing the pending cache snoop request from the buffer.

13. The method as recited in claim 12, further comprising the cache controller processing pending snoop requests in an order in which they were stored into the buffer.

14. The method as recited in claim 8, further comprising the cache controller processing non-latency sensitive snoop requests in an order in which they are received when no latency-sensitive snoop requests are pending.

15. A system comprising:
a processor core;
a cache memory; and
a cache controller coupled to the cache memory and further coupled to the processor core by a communications channel, wherein the processor core is configured to convey cache snoop requests to the cache controller via the communications channel, the cache snoop requests including latency-sensitive snoop requests and non-latency sensitive snoop requests, wherein cache snoop requests are not prioritized by type over one another in the communications channel;
wherein the cache controller is configured to prioritize processing of latency-sensitive snoop requests over non-latency sensitive snoop requests responsive to determining that a number of non-latency snoop requests received thereby has reached a predetermined value.

16. The system as recited in claim 15, wherein the cache controller is configured to, responsive to determining that the predetermined value has been reached, re-order cache snoop requests such that an incoming latency-sensitive request is processed ahead of one or more received non-latency snoop requests.

17. The system as recited in claim 15, wherein the cache controller is configured to store incoming non-latency sensitive snoop requests in a retry buffer responsive to the predetermined value having been reached.

18. The system as recited in claim 15, wherein the cache controller is configured to discard incoming non-latency sensitive snoop requests when the predetermined value has been reached.

19. The system as recited in claim 15, wherein the cache controller is configured to process non-latency sensitive snoop requests in an order in which they are received when no latency-sensitive snoop requests are pending.

20. The system as recited in claim 15, wherein the cache controller includes a buffer configured to store pending cache snoop requests.

* * * * *